(12) United States Patent
Schachtrup et al.

(10) Patent No.: US 8,691,090 B2
(45) Date of Patent: Apr. 8, 2014

(54) COOLANT CONDITIONING UNIT COMPRISING A NON-RETURN VALVE

(75) Inventors: Ludger Schachtrup, Muenster (DE); Richard Eberle, Muenster (DE)

(73) Assignee: Hengst GmbH & Co. KG., Muenster (DE)

(*) Notice: Subject to any disclaimer, the term of this patent is extended or adjusted under 35 U.S.C. 154(b) by 1346 days.

(21) Appl. No.: 11/572,182

(22) PCT Filed: Jul. 13, 2005

(86) PCT No.: PCT/DE2005/001240
§ 371 (c)(1),
(2), (4) Date: Nov. 27, 2007

(87) PCT Pub. No.: WO2006/005331
PCT Pub. Date: Jan. 19, 2006

(65) Prior Publication Data
US 2008/0190832 A1   Aug. 14, 2008

(30) Foreign Application Priority Data
Jul. 14, 2004  (DE) ............... 20 2004 011 104 U
Nov. 16, 2004  (DE) ............... 20 2004 017 745 U (51) Int. Cl.
*B01D 35/02*  (2006.01)
*F01P 11/00*  (2006.01)
*F01P 11/06*  (2006.01)

(52) U.S. Cl.
USPC ...... 210/235; 210/234; 210/130; 210/167.01; 210/302

(58) Field of Classification Search
USPC ........... 210/167.01, 136, 234, 235; 123/41.08
See application file for complete search history.

(56) References Cited

U.S. PATENT DOCUMENTS

| 3,682,308 | A | * | 8/1972 | Moon | 210/136 |
| 5,098,559 | A | * | 3/1992 | Mack et al. | 210/130 |
| 5,520,801 | A | * | 5/1996 | Gerber et al. | 210/130 |
| 5,560,824 | A | | 10/1996 | Sann et al. | |
| 5,753,116 | A | * | 5/1998 | Baumann et al. | 210/206 |
| 6,488,845 | B1 | | 12/2002 | Neudeld et al. | |
| 2002/0036162 | A1 | | 3/2002 | Magnusson et al. | |
| 2004/0016687 | A1 | * | 1/2004 | Jainek | 210/130 |

FOREIGN PATENT DOCUMENTS

| DE | 4022723 | 12/1992 |
| DE | 20211448 | 12/2003 |
| DE | 20 2004 017745 | 4/2006 |
| EP | 1210164 | 5/2004 |
| GB | 2208068 | 2/1989 |

* cited by examiner

*Primary Examiner* — Vickie Kim
*Assistant Examiner* — Peter Keyworth
(74) *Attorney, Agent, or Firm* — Greenblum & Bernstein, P.L.C.

(57) ABSTRACT

Coolant conditioning unit for coolant of an internal combustion engine. The unit includes a cup-shaped housing, a removable cover for closing the housing, a replaceable filter insert arranged in the housing and being detachably connected to the cover, an inlet, an anti-drain valve that is normally open during filtering, and a stop valve arranged in the inlet. The stop valve is held in an open position by the filter insert and closes when the filter insert is removed from the housing and closes before the cover has been completely separated from the housing. This abstract is not intended to define the invention disclosed in the specification, nor intended to limit the scope of the invention in any way.

20 Claims, 6 Drawing Sheets

COOLANT CONDITIONING UNIT COMPRISING A NON-RETURN VALVE

CROSS-REFERENCE TO RELATED APPLICATIONS

The present application is a U.S. National Stage of International Patent Application No. PCT/DE2005/001240 filed Jul. 13, 2005 which published as WO 2006/005331 on Jan. 19, 2006, and claims priority of German Patent Application Nos. 20 2004 011 104.7 filed Jul. 4, 2004 and 20 2004 017 745.5 filed on Nov. 16, 2004.

BACKGROUND OF THE INVENTION

1. Field of the Invention

The invention relates to a coolant conditioning unit for the coolant of an internal combustion engine.

2. Discussion of Background Information

Coolant conditioning units of this type are known from practice. On the one hand, they make it possible to extend the useful life of the coolant by filtering it. With conditioning units of this type it is furthermore customarily provided to use a cartridge with conditioning agent when changing the filter insert. This cartridge is automatically opened when the filter insert is inserted into the housing and adds conditioning additives into the coolant circuit, e.g., so-called "inhibitors," which can serve, e.g., as antifreeze and corrosion inhibitor.

With coolant conditioning units of this type, the so-called filter change, i.e., the change of the filter insert, often takes place when the coolant still has a relatively high temperature, and the coolant system is under pressure.

SUMMARY OF THE INVENTION

The invention aims to improve a generic coolant conditioning unit to make it possible to change the filter insert safely and, in particular, to open the coolant filter safely.

In other words, the invention provides for closing off the interior of the filter housing with respect to the remaining coolant circuit, so that excess pressure prevailing in the coolant circuit cannot cause hot coolant to leak or spurt out of the filter housing when the cover is removed from the housing. The pressure prevailing in the filter housing itself is relieved in that the cover is removed, and the coolant located in the filter housing can decompress in the meantime before the cover is removed completely, and the sealing bond between cover and housing is broken.

There is a shut-off with respect to the remaining coolant circuit at two points, namely at the coolant supply and at the coolant return line. A check valve can be provided in this return line, so that during normal operation—driven by the coolant pump—a higher pressure prevails on the clean side of the coolant filter than in the remaining coolant circuit, whereby the "remaining coolant circuit" is understood within the scope of the present invention to be the sections of the coolant circuit that connect directly to the mentioned valves provided according to the invention. During normal operation the check valve opens as a result of the pressure difference. During a filter change, or when the coolant filter is opened for other reasons, and the pressure in the filter interior is relieved, a lower pressure prevails there than in the remaining coolant circuit, so that the mentioned check valve closes in the return line.

A stop valve is provided in the inlet. The stop valve does not open or close in a pressure-actuated manner, but does so instead in a path-actuated manner. The filter insert pushes the movable valve body of this stop valve into its open position. If the cover is removed from the housing, the filter insert is thereby also moved at the same time. The insert is connected to the cover, e.g., by a clip connection. This movement of the filter insert also reduces the impingement with which the filter insert acts on the valve body of the stop valve. The valve body can be guided into its closed position, e.g., in a spring-loaded manner. As the cover is removed from the housing of the filter, the filter insert is correspondingly moved as well. Instead of the above-mentioned spring, a movement of the valve body can also be provided solely by way of the pressure prevailing in the remaining coolant circuit, so that the stop valve is no longer forced to remain open when the filter insert is removed from the valve body, but can be pushed into its closed position, following the pressure in the coolant circuit.

Advantageously, the filter insert can be embodied in a manner known per se as an approximately cylindrical insert with an upper end plate, which has, e.g., the snap-in connection with the cover, and with a lower end plate, which bears against the valve body as a pressure plate or acts directly or indirectly on the valve body and pushes it into its open position when the filter insert is in its operating position.

Advantageously, a tappet can be provided that connects to the valve body and extends up to the end plate of the filter insert. In this manner, an arrangement of the valve body and the corresponding sealing surface of the stop valve can be provided at an appropriate position without any problems. This position potentially is at a distance from the end plate of the filter insert, whereby the tappet spans this distance and renders possible the impingement of the valve body by the end plate.

The above-mentioned end plate can preferably be strengthened in the area that acts on the stop valve. The end plate can thus basically be embodied in a material-saving manner, while it is reinforced only in the necessary area that acts on the stop valve, so that a reliable actuation of the stop valve is ensured, and deformations of the end plate, as may occur at the temperatures and pressures prevailing during operation, are ruled out.

The above-mentioned strengthening of the end plate can be effected, e.g., by a perimeter bulge.

Advantageously, an amount of overlap that is initially unnecessarily large for structural reasons can be provided between the cover and the housing of the filter. Under the usual operating conditions, a seal ensures the reliable tightness between cover and housing. Through the large overlap area, this tightness is still ensured, even when the cover has already been partially removed from the housing. In this manner, a movement clearance is created for the cover, which clearance can be used to close the stop valve during this movement and at the same time reliably seal the interior of the filter to the outside, i.e., towards the user, so that the user is reliably protected from leaking coolant. Only after a distance that has reliably caused the closing of the stop valve does the cover come clear of the housing far enough for the seal to be no longer effective between cover and housing. However, an unexpected leaking of pressurized coolant from the filter interior is no longer possible in this position of the cover, because the stop valve and the check valve actuated in a pressure-dependent manner have closed off the filter interior with respect to the remaining coolant circuit, so that the filter insert can now be removed safely.

The invention also provides for a coolant conditioning unit for coolant of an internal combustion engine, wherein the unit comprises a cup-shaped housing, a removable cover for closing the housing, a replaceable filter insert arranged in the housing and being detachably connected to the cover, an inlet, an anti-drain valve that is normally open during filtering, and a stop valve arranged in the inlet. The stop valve is held in an open position by the filter insert and closes when the filter insert is removed from the housing and closes before the cover has been completely separated from the housing.

The inlet may be adapted to receiving unfiltered coolant and further comprising a return line guiding filtered coolant to a coolant circuit. The anti-drain valve may be arranged in a return line and the stop valve is a path-actuated stop valve. The filter insert may be essentially cylindrical and may comprise an end plate, the end plate being arranged adjacent to the stop valve and being structured and arranged to cause movement of a valve body of the stop valve. The stop valve may comprise a tappet that connects to a valve body and has one end that extends up to a end plate of the filter insert. The filter insert may comprise an end plate having a guide groove adapted to guide a tappet of the stop valve. The filter insert may comprise an end plate having a strengthened area which acts on the stop valve. The filter insert may comprise an end plate having a perimeter bulge. The unit may further comprise a seal arranged between the cover and the housing. The cover and the housing may overlap over a certain distance, whereby a overlap area is reduced when the cover is removed from the housing, whereby the stop valve assumes a closed position while the cover and the housing remain in an overlapping position, and whereby the seal provides sealing after the stop valve closes. The cover and the housing may be threadably connected to each other. The stop valve may move to the closed position via one of a spring and pressure that is greater than a pressure in the housing.

The invention also provides for a coolant conditioning unit for coolant of an internal combustion engine, wherein the unit comprises a housing, a removable cover, a replaceable filter insert arranged in the housing, an inlet, an anti-drain valve that is normally open during filtering, and a stop valve that assumes an open position when the filter insert is arranged in the housing, closes when the filter insert is removed from the housing, and closes before the cover has been completely separated from the housing.

The cover and the housing may overlap over a certain distance, whereby a overlap area is reduced when the cover is removed from the housing, whereby the stop valve assumes a closed position while the cover and the housing remain in an overlapping position, and whereby a seal provides sealing after the stop valve closes. The stop valve may move to the closed position via one of a spring and pressure that is greater than a pressure in the housing.

The invention also provides for a coolant conditioning unit for coolant of an internal combustion engine, wherein the unit comprises a housing, a removable cover that can be removed without causing coolant from flowing out of the housing, a replaceable filter insert arranged in the housing, an inlet, an anti-drain valve that is normally open during filtering, and a stop valve that assumes an open position when the filter insert is arranged in the housing, closes when the filter insert is removed from the housing, and closes before the cover has been completely separated from the housing.

The cover and the housing may overlap over a certain distance, whereby a overlap area is reduced when the cover is removed from the housing, whereby the stop valve assumes a closed position while the cover and the housing remain in an overlapping position, and whereby a seal provides sealing after the stop valve closes.

The stop valve may move to the closed position via one of a spring and pressure that is greater than a pressure in the housing.

BRIEF DESCRIPTION OF THE DRAWINGS

Exemplary embodiments of the invention are explained below in more detail on the basis of the purely diagrammatic drawings wherein.

DETAILED DESCRIPTION OF THE INVENTION

Figure 1:
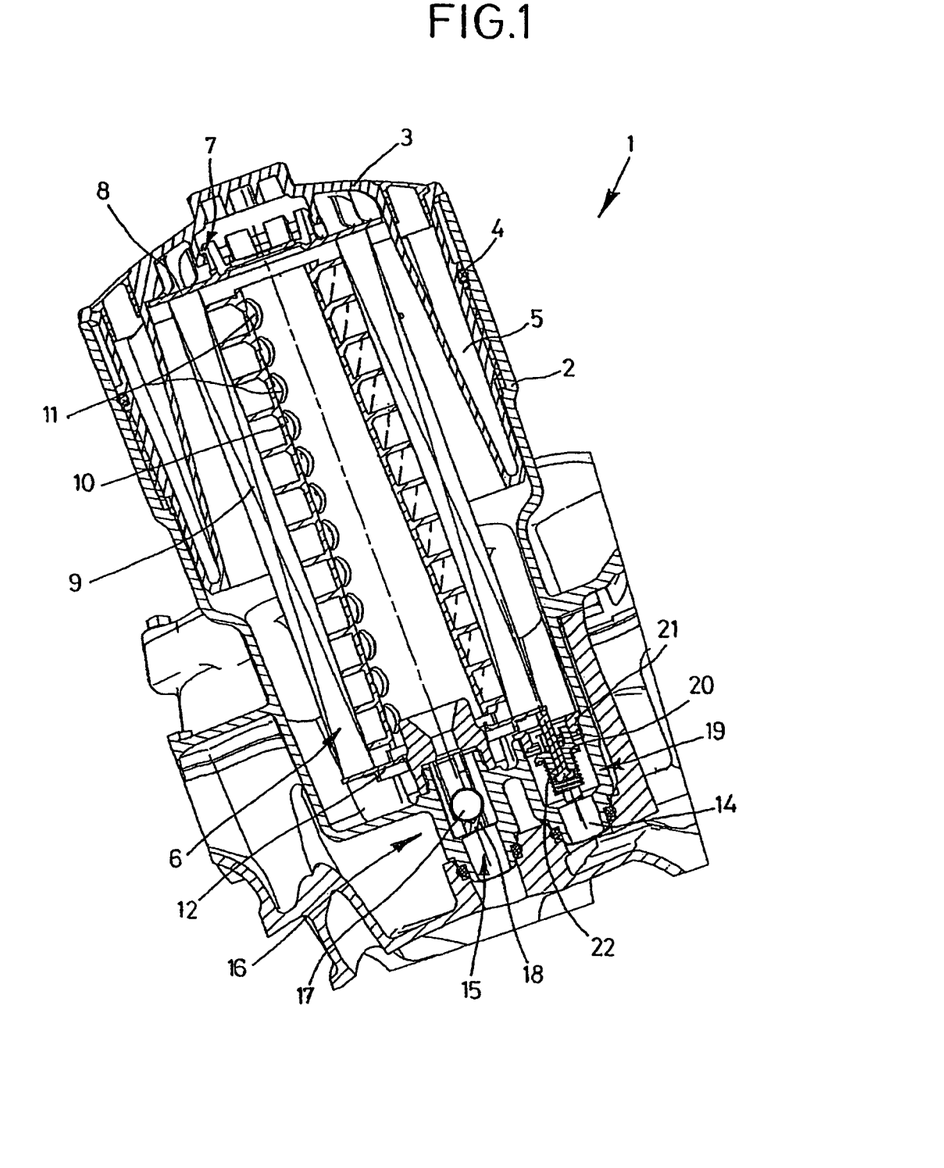
FIG. 1 shows an overall cross section through a coolant conditioning unit of a first exemplary embodiment.
Figure 3:
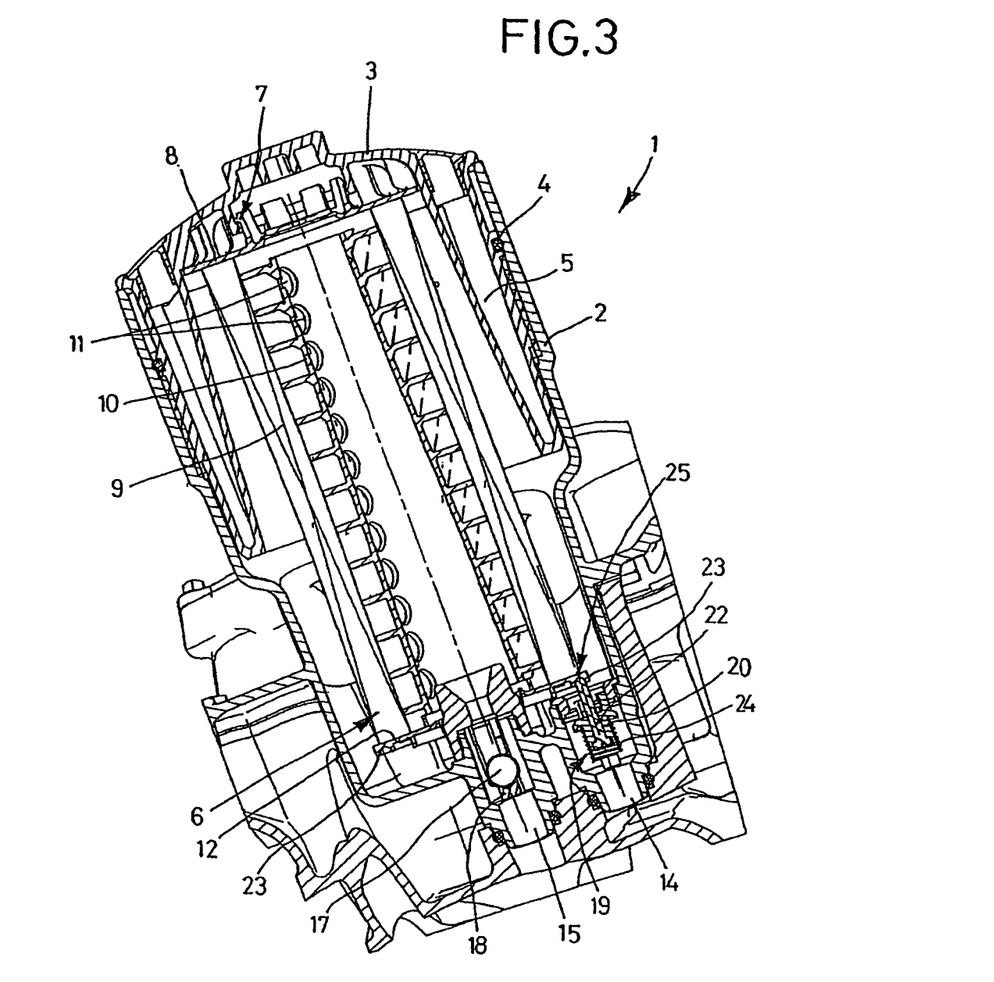
FIGS. 3 and 4 show views similar to FIGS. 1 and 2, but of a second exemplary embodiment.

FIGS. 1 and 3, respectively show a coolant conditioning unit 1. This unit has a cup-shaped housing 2 and a cover 3 embodied as a screw cover and screwed together with the housing 2. A perimeter O-ring seal 4 is provided between cover 3 and housing 2. The cover 3 has a displacement body 5 which makes it impossible for the interior of the housing 2 to be completely filled with coolant. When the cover 3 is removed from the housing 2, the liquid level in the interior of the housing is thus automatically lowered, so that even when the housing 2 is inclined to an extent customary during operation, it is ensured that no coolant can flow off over the upper edge of the housing 2, but remains reliably within the housing 2.

A filter insert 6 is connected to the cover 3, namely via a snap-in connection 7 provided on an upper end plate 8 of the filter insert 6 embodied overall to be essentially cylindrical. The filter insert 6 has a filter medium 9 in the form of, e.g., a folded paper filter, and an inner support dome 10 featuring openings 11. At its lower end, the filter insert 6 has a lower end plate 12.

The coolant flows through an inlet 14 radially outside the filter insert 6 into the housing 2. After passing through the filter medium 9, the coolant reaches the interior of the filter insert 6 and flows back there through a return line 15. A check valve 16 with a valve body embodied as a sphere 17 is provided in the return line 15. The check valve 16 is embodied as a so-called float valve. In the operating state depicted in the drawing, the sphere 17 bears against a lower stop 18. It can be lifted and pressed against its valve seat through the effect of its buoyancy and through the pressure prevailing in the remaining coolant circuit when the pressure prevailing in the interior of the housing 2 and in particular in the interior on the clean side of the filter insert 6 is correspondingly low with respect to the pressure in the remaining coolant circuit below the sphere 17.

Figure 2:
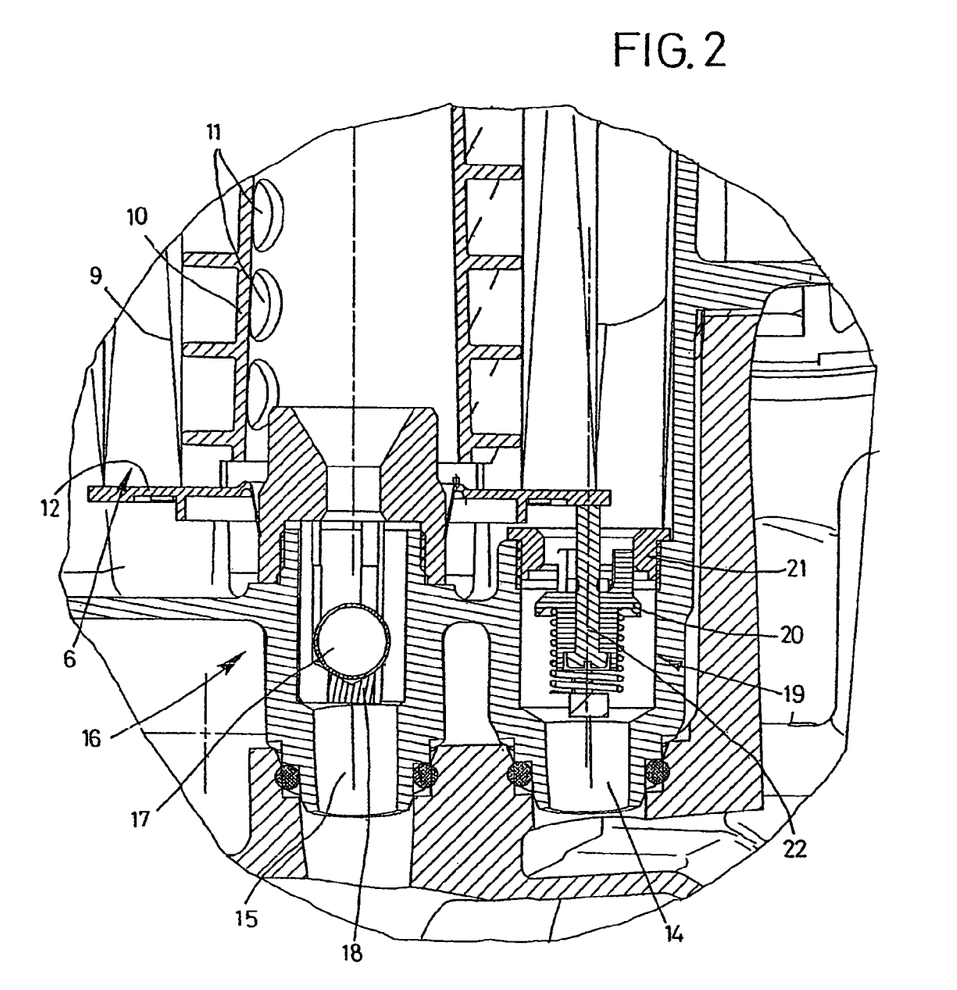
FIG. 2 shows an area of the stop valve of the unit of FIG. 1 on a larger scale with respect to FIG. 1.
Figure 4:
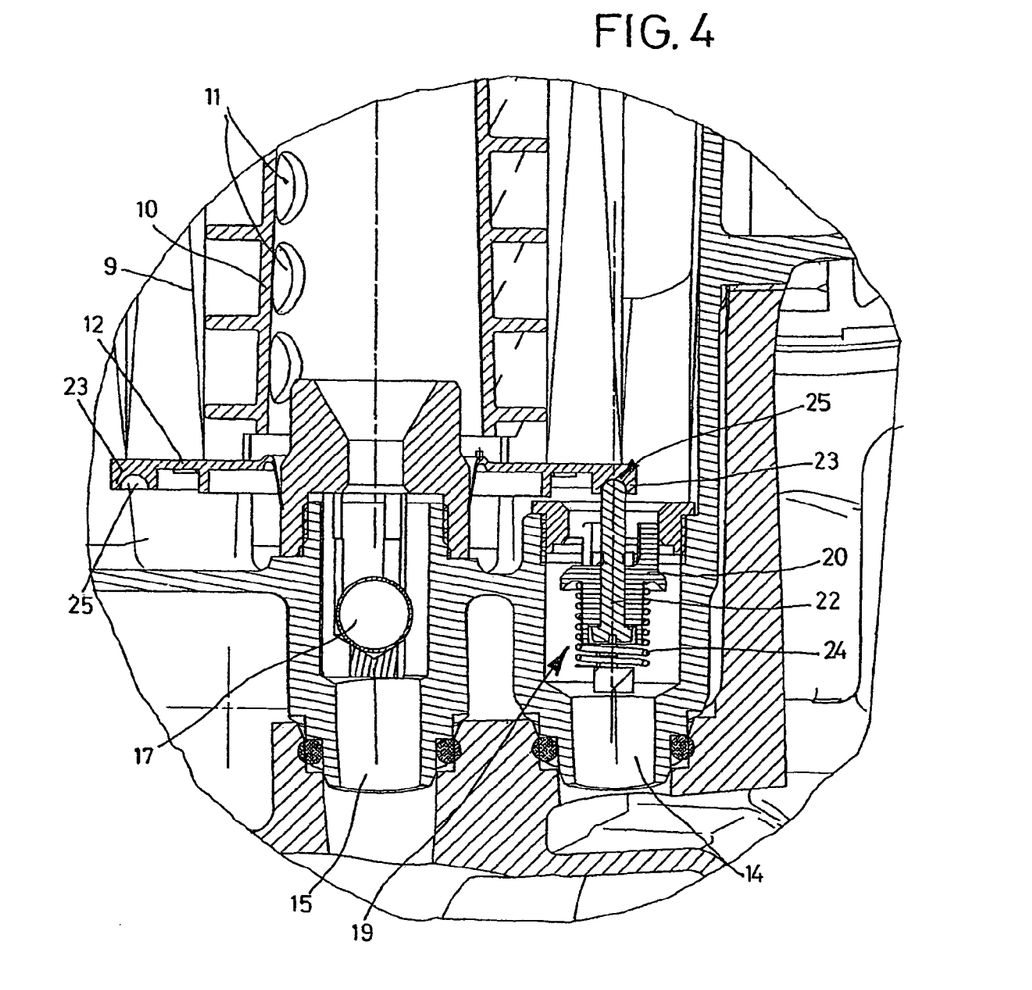

A stop valve 19 visible in more detail in particular in FIGS. 2 and 4 is provided in the inlet 14. This stop valve has a movable valve body 20 and a collar-shaped valve seat 21. The valve body 20 is connected to a tappet 22 against which the lower end plate 12 bears. In the exemplary embodiment of FIGS. 3 and 4, the lower end plate 12 is strengthened and thus reinforced along its outer circumference by a lower perimeter bulge 23, so that it does not deform under the pressure of the tappet 22 and allow an inadmissible closing movement of the stop valve 19.

Furthermore, the bulge 23 embodies a guide groove 25 in which the upper end of the tappet 22 is guided.

The closing movement of the stop valve 19 is made possible when the cover 3 is screwed out of the housing 2. In this case, with the alignment of the housing 2 provided in the drawing, the filter insert 6 together with the cover 3 moves upward as well. With a corresponding preloading of the stop valve 19, the tappet 22 and thus the valve body 20 can follow this movement, so that the valve body 20 comes closer to the valve seat 21, the further the cover 3 is loosened from the housing 2.

The mentioned preloading of the stop valve 19 can either be effected by a spring 24, whereby the valve body 20 is held in its open position by the filter insert 6 against the effect of this spring 24, or the preloading mentioned can be realized by the pressure prevailing in the remaining coolant circuit, which pressure is higher than the pressure prevailing in the housing 2, in particular if the effective interior volume of the housing 2 is enlarged by unscrewing the cover 3.

Because of this pressure difference the valve body 20 is pressed into its closed position, even if the spring 24 shown were not present. However, should the housing 2 be opened when the coolant is cold and thus without pressure, the stop valve 19 would not be closed if the valve body 20 were pushed into its closed position exclusively due to the interior pressure in the coolant circuit. In a case of this type, however, there would be no fear of the hot coolant suddenly leaking out either, so that there would be an automatic, temperature-dependent and self-regulating action of the stop valve 19.

Irrespective of whether the spring 24 provided in the drawing is present or not, the stop valve 19 is a path-actuated valve, since the open position of the valve body 20 is forced in any case depending on the displacement of the position of the filter insert.

The arrangement of the seal 4 provided on the cover 3 is provided spaced so far apart from the upper edge of the housing 2 that this distance is larger than the path the valve body 20 has to travel from its open position depicted to its closed position. It is thus ensured that the stop valve 19 is closed when the seal 4 is still effective in a sealing manner during the removal of the cover 3 from the housing 2. Only in the further course of this removal movement of the cover 3 does the seal 4 reach the upper edge of the housing 2 and lose its effectiveness. In this case, however, the check valve and stop valve 16 and 19 are closed, and it is also reliably ensured because of the displacement body 5 that excess pressure no longer prevails in the interior of the housing 2 shortly before the seal 4 loses its effectiveness, which excess pressure could lead to a sudden leaking of hot coolant.

Figure 5:
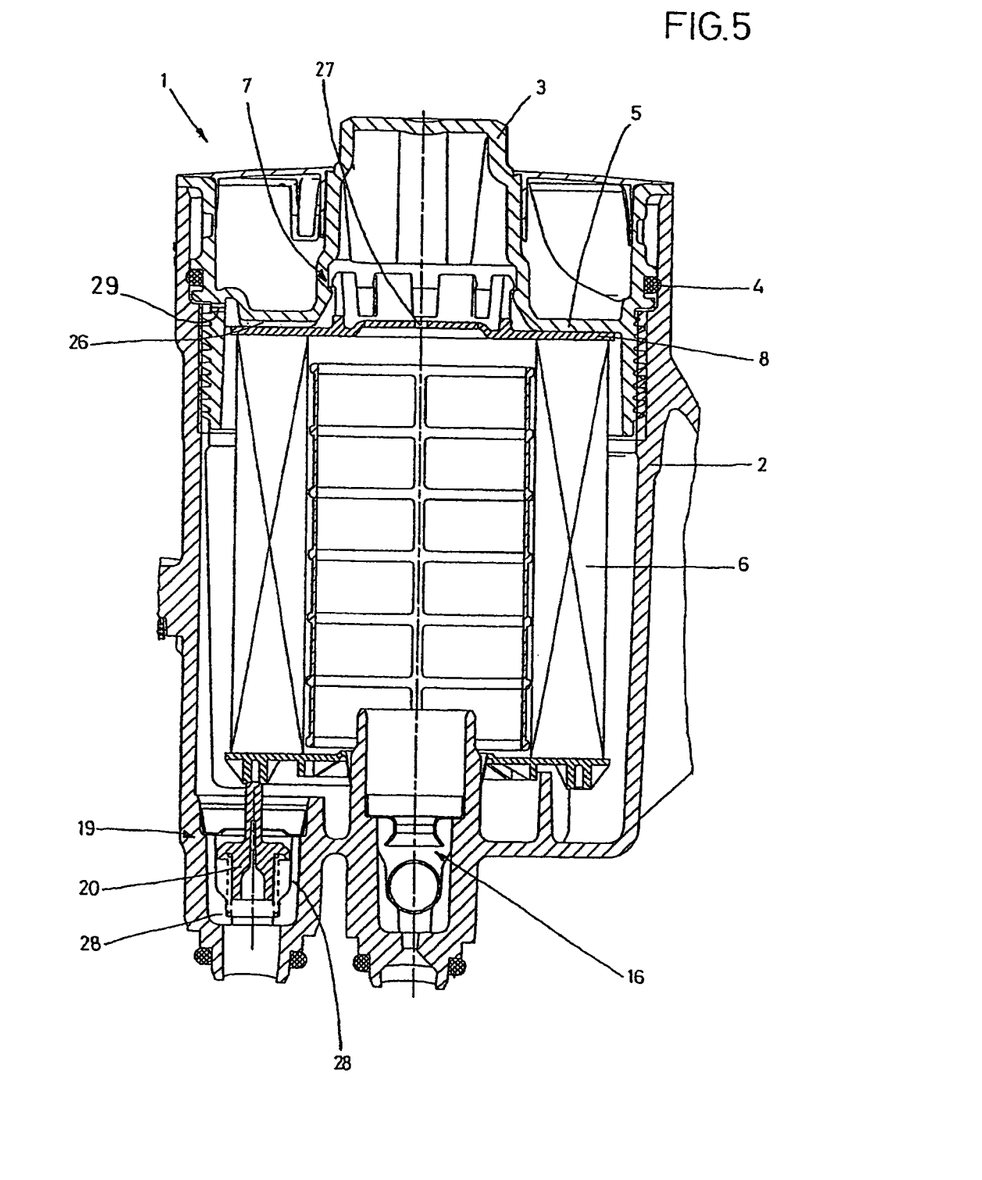
FIGS. 5 and 6 show views similar to FIGS. 1 and 3, but of a third exemplary embodiment, with two positions of the cover unscrewed to different extents.
Figure 6:
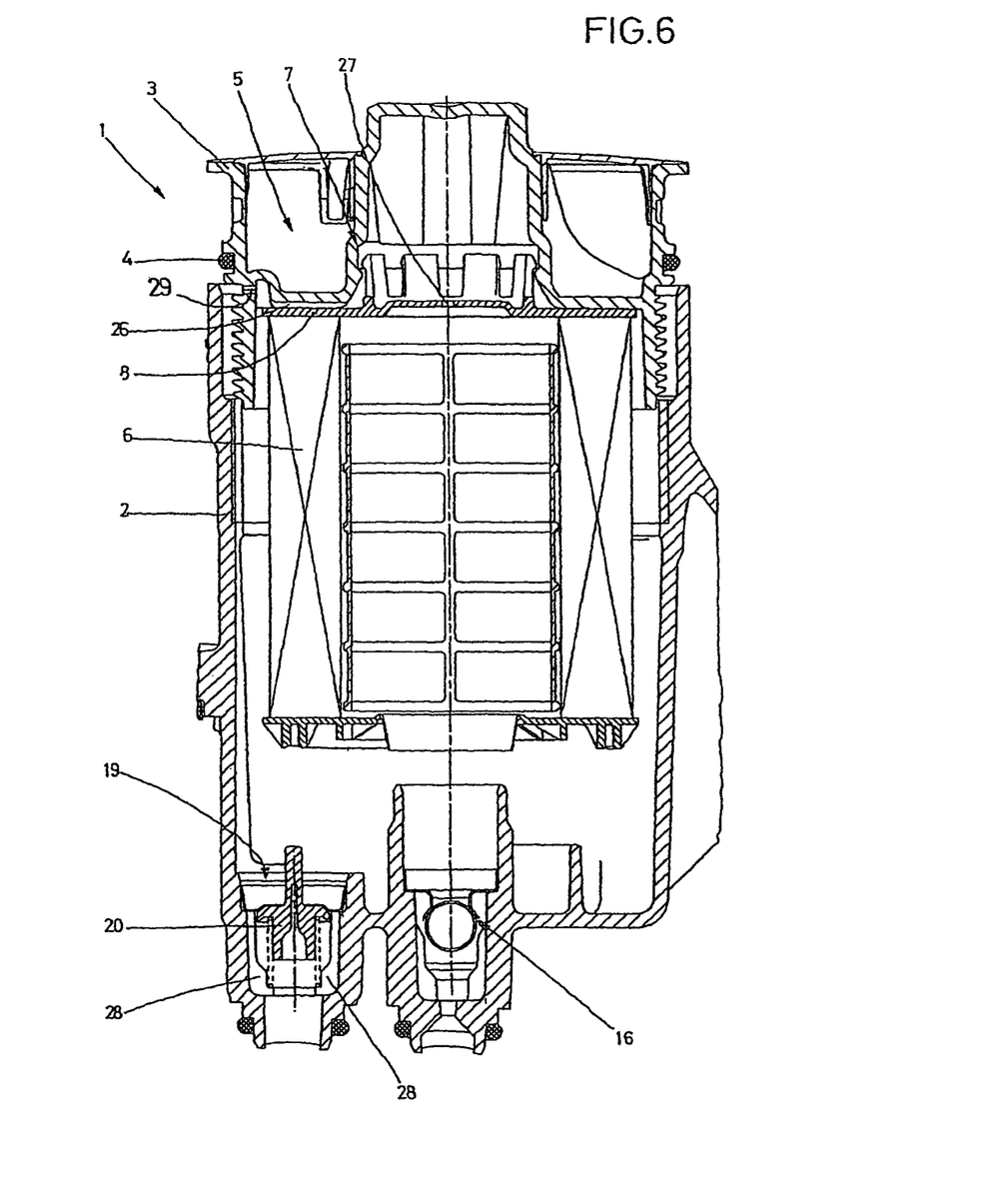

In the exemplary embodiment of FIGS. 5 and 6, identical or identically acting component parts are provided with the same reference numbers as in the exemplary embodiments of FIGS. 1 through 4. Reference is made below only to those features that differentiate this third exemplary embodiment from the other two exemplary embodiments, so that only the units or components relevant in connection therewith are mentioned and provided with reference numbers in the drawings.

FIG. 5 shows a third exemplary embodiment in the state ready for operation, i.e., with the cover 3 completely screwed into the housing 2. The displacement body 5 is thereby not provided radially outside the filter insert 6, but exclusively above the upper end plate 8 of the filter insert 6. The radial constructed space within the housing 2 can thus be utilized optimally, so that either a filter insert 6 with very wide folds can be used, or the diameter of the housing 2 can be kept comparatively small, and can still be arranged at an optimum location even under conditions of limited space. Although the axial extension of the coolant conditioning unit 1 is enlarged by shifting the displacement body 5 axially in front of the filter insert 6, there is, however, usually enough free space available in this direction, since the cover 3 is provided to be accessible anyway in this direction for maintenance tasks.

In the exemplary embodiment of FIGS. 5 and 6, a vent line 26 is realized in the cover 3, which vent line leads to a corresponding air vent 27 in the upper end plate 8 of the filter insert 6. Advantageously in terms of production technology, the vent line 26 is not realized by a bore, but by one or more ribs on the underside of the cover 3, where the cover 3 forms the displacer body 5. Alternatively, vent lines of this type can be realized by recesses, i.e., creases in the lower edge of the cover 3, or also by corresponding ribs or creases in the surface of the upper end plate 8. In any case, the vent line 26 represents a short circuit, i.e., a bypass of the filter insert 6, so that unclean coolant can reach the clean side of the filter through the vent bore 27, bypassing the filter insert 6. But since the filter is designed merely as a partial-flow filter anyway and merely a part of the overall recirculated coolant filter, this bypass of the filter insert 6 does not represent any relevant impairment of the filter function.

To the left of the vent line 26, a bore 29 is respectively visible in FIGS. 5 and 6, which bore extends through the cover 3. Together with the vent line 26 and the air vent 27 it renders possible a venting of the housing 2 when the filter insert 6 is inserted into the housing 2, and the air present in the housing 2 at first is thereby displaced. The air displaced from the housing 2 can escape through the bore 29 until the seal 4 touches the housing 2 and bears against it in a sealing manner.

In the exemplary embodiment of FIGS. 5 and 6, the stop valve 19 is shown only by way of example to the left of the anti-drain valve 16, i.e., on the opposite side with respect to the other exemplary embodiments.

The valve body 20 of the stop valve 19 is guided through ribs 28 in the axial direction, whereby these ribs are molded in the housing 2, so that the guiding of the valve body 20 is ensured in a technically simple and economically advantageous manner.

As is revealed, in particular, by the comparison between FIGS. 5 and 6, the length of the thread between housing 2 and cover 3 and the position of the seal 4 are coordinated with one another such that the internal and external thread of the housing 2 and the cover 3 mesh with one another before the sealing ring bears against its sealing surface provided in the housing 2. When the cover 3 is screwed into the housing 2, the seal 4 is thus drawn into the housing 2 as well. On the one hand, this facilitates handling when the cover 3 is screwed in and furthermore ensures that a kind of centering of the cover 3 takes place through the thread, so that the seal 4 bears against the associated sealing surface of the housing 2 as evenly as possible on the entire circumference, and an excessive one-sided loading of the seal 4 is avoided, which might lead to the seal being damaged.

The invention claimed is:

1. A coolant conditioning unit for coolant of an internal combustion engine, the unit comprising:
    a cup-shaped housing;
    a removable cover for closing the housing;
    a seal providing sealing in an area wherein the housing and the cover overlap;
    a replaceable filter insert arranged in the housing and being detachably connected to the cover;
    an inlet;
    an anti-drain valve that is normally open during filtering; and
    a stop valve arranged in the inlet,
    wherein the stop valve has the following modes of operation:
        is held in an open position by the filter insert;

closes when the filter insert is removed from the housing; and closes while the seal provides sealing in the area of overlap, after the cover has moved away from the housing during partial removal of the cover, and before the cover has been completely separated from the housing.

2. The unit of claim 1, wherein the inlet is adapted to receiving unfiltered coolant and further comprising a return line guiding filtered coolant to a coolant circuit.

3. The unit of claim 1, wherein the anti-drain valve is arranged in a return line and the stop valve is a path-actuated stop valve.

4. The unit of claim 1, wherein the filter insert is essentially cylindrical and comprises an end plate, the end plate being arranged adjacent to the stop valve and being structured and arranged to cause movement of a valve body of the stop valve.

5. The unit of claim 1, wherein the stop valve comprise a tappet that connects to a valve body and has one end that extends up to a end plate of the filter insert.

6. The unit of claim 1, wherein the filter insert comprises an end plate having a guide groove adapted to guide a tappet of the stop valve.

7. The unit of claim 1, wherein the filter insert comprises an end plate having a strengthened area which acts on the stop valve.

8. The unit of claim 1, wherein the filter insert comprises an end plate having a perimeter bulge.

9. The unit of claim 1, wherein the cover and the housing are threadably connected to each other.

10. The unit of claim 1, wherein the stop valve moves to the closed position via one of a spring and pressure that is greater than a pressure in the housing.

11. The unit of claim 1, wherein when the stop valve is closed, the stop valve prevents coolant from passing from the inlet into the housing.

12. The unit of claim 1, wherein the unit is configured to allow coolant located inside the housing to decompress while sealing is maintained and before the cover is completely removed.

13. The unit of claim 12, wherein an axial distance between the stop valve and a cover receiving end of the housing is greater than an axial length of the cover.

14. The unit of claim 1, wherein an axial distance between the stop valve and a cover receiving end of the housing is greater than an axial length of the cover.

15. A coolant conditioning unit for coolant of an internal combustion engine, the unit comprising:
a housing having a cover receiving end;
a removable cover having an axial length that is less than an axial length of the housing;
a replaceable filter insert arranged in the housing;
an inlet;
an anti-drain valve that is normally open during filtering; and
a stop valve having the following modes of operation:
assumes an open position when the filter insert is arranged in the housing;
initially closes when the filter insert is partially removed from the housing;
is closed before the cover has been completely separated from the housing; and
when closed, prevents coolant from passing from the inlet into the housing; and
an axial distance between the stop valve and the cover receiving end being greater than an axial length of the cover.

16. The unit of claim 15, wherein the cover and the housing overlap over a certain distance, whereby a overlap area is reduced when the cover is removed from the housing, whereby the stop valve assumes the closed position while the cover and the housing remain in an overlapping position, and further comprising a seal that provides sealing in the overlap after the stop valve closes.

17. The unit of claim 15, wherein the stop valve moves to the closed position via one of a spring and pressure that is greater than a pressure in the housing.

18. A coolant conditioning unit for coolant of an internal combustion engine, the unit comprising:
a housing;
a removable cover that can be removed without causing coolant from flowing out of the housing;
a seal arranged in an area where the cover and the housing overlap;
a replaceable filter insert arranged in the housing;
an inlet;
an anti-drain valve that is normally open during filtering; and
a stop valve having the following modes of operation:
assumes an open position when the filter insert is arranged in the housing and the cover is connected to the housing;
closes when the filter insert is removed from the housing;
closes after the cover is partially removed and before the cover has been completely separated from the housing; and
when closed, prevents coolant from passing from the inlet into the housing,
wherein the unit is configured to allow coolant located inside the housing to decompress while sealing is maintained and before the cover is completely removed.

19. The unit of claim 18, wherein the cover and the housing overlap over a certain distance, whereby a overlap area is reduced when the cover is partially removed from the housing, whereby the stop valve assumes the closed position while the cover and the housing remain in an overlapping position.

20. The unit of claim 18, wherein the stop valve moves to the closed position via one of a spring and pressure that is greater than a pressure in the housing.

* * * * *